United States Patent [19]

DiStefano et al.

[11] 4,204,725
[45] May 27, 1980

[54] APPARATUS FOR DETECTING INFORMATION STORED ON PHOTOCOPYING MEDIA, TRANSMITTING AND STORING THE SAME

[75] Inventors: Thomas H. DiStefano, Bronxville; Lawrence Kuhn, Mt. Kisco, both of N.Y.

[73] Assignee: International Business Machines Corporation, Armonk, N.Y.

[21] Appl. No.: 852,394

[22] Filed: Nov. 17, 1977

[51] Int. Cl.² .............................................. G03G 15/00
[52] U.S. Cl. .............................. 355/3 R; 355/14 CH; 358/300; 365/112
[58] Field of Search .................. 355/3 R, 8, 133, 14 R, 355/14 CH; 358/300; 365/106, 112, 126

[56] References Cited

U.S. PATENT DOCUMENTS

| | | | |
|---|---|---|---|
| 3,050,580 | 8/1962 | Schwertz | 358/300 |
| 3,660,818 | 5/1972 | Amodei et al. | 355/3 R X |
| 4,014,030 | 3/1977 | Stark et al. | 358/300 X |
| 4,042,962 | 8/1977 | Yamaji et al. | 358/300 |
| 4,046,471 | 9/1977 | Branham et al. | 355/3 R X |
| 4,085,455 | 4/1978 | Okumura | 365/112 |

Primary Examiner—Fred L. Braun
Attorney, Agent, or Firm—Hansel L. McGee

[57] ABSTRACT

A printer/copier having the added capabilities of scanning information from photocopying media, for the purpose of storing it in computer memories or transmitting it over communication lines. The printer/copier has a sensing electrode which detects the charge change on a photoconductor surface as it is being scanned by a laser beam. The laser can also be used to expose the photoconductor for the purpose of printing. A deconvolution circuit is also provided to convert the detected charge to a storable or transmittable coded signal.

7 Claims, 9 Drawing Figures

APPARATUS FOR DETECTING INFORMATION STORED ON PHOTOCOPYING MEDIA, TRANSMITTING AND STORING THE SAME

BACKGROUND OF THE INVENTION

Prior Art

Presently there is considerable attention being paid to methods by which a laser-electrophotographic printer/copier terminal can be used to scan a document and convert information on a document into electrical signals. A terminal with such a scanning capability can be used as a high performance facsimile terminal. Two approaches to this objective are to use the laser beam existing in the terminal to sense the document image either by scanning the original or by scanning the toned image on the photoconducting drum. Both of these schemes have serious drawbacs. For example, the former scheme lacks panchromatic response and requires cumbersome optics. In addition, as a result of the potential health hazard involved since the scanning laser beam is directed up and toward the original document, this approach requires awkward covers. The latter scheme is fundamentally awkward in that both the photoconductor and the toner particles are absorbing at the wavelength of the printing laser so that contrast is very poor and the resulting signal difficult to process. Multiwavelength lasers would solve the problem but are expensive and not sufficiently reliable.

Additionally, the development of a printer/copier facsimile transmitting terminal has been discouraged because of the long time it takes for a laser to discharge the surface of the photoconductor. For example, in order for the facsimile transmitting capabilities to be practical, the photoconductor must be completely scanned by a laser beam within several seconds. At this scan speed, the laser dwells on each picture element for only a fraction of a microsecond. In such a small time, it is difficult to sufficiently discharge the photoconductor to produce a useable signal, because of the finite time required for laser excited charge to transit the photoconductor.

SUMMARY OF THE INVENTION

In accordance with the present invention, there is provided an improved laser-electrophotographic printer-copier having image scanning capability.

The present invention comprises a conventional prior art laser electro-photographic printer-copier device incorporating generally an optical system for transferring an image onto a photoconductor surface supported on a drum for use in the copier mode. For use in the printer mode there is provided a scanning laser together with accompanying optics which scan a focused laser beam over the surface of the photoconductor. What is added by this invention is a sensing electrode with accompanying amplifying and compensating circuitry. The sensing electrode and circuitry sense the discharge of current from an image of a previously produced charge pattern on a photoconductor surface, said discharge being induced by the scanning laser beam. This current is converted into a codable signal for either computer storage or for subsequent transmission.

It is therefore an object of the present invention to provide an improved electrophotographic printer/copier.

It is a further object of the invention to provide an improved electrophotographic printer/copier having document scanning and transmission capabilities for facsimile storage and transmission.

It is yet another object of the present invention to provide an improved optical scanning device.

Still another object of the present invention is to provide an improved optical scanning device having the capability of point by point sensing of an image on a charged photoconductor surface.

And yet another object of the present invention is to provide an improved optical scanning device having the capability of point by point discharging of an image on a charged photoconductor surface and having sensing means to detect the resulting change in charge on said photoconductor surface.

The foregoing objects, features and advantages of the invention will be apparent from the following more particular description of the preferred embodiments of the invention as illustrated in the accompanying drawings.

DETAILED DESCRIPTION OF THE DRAWINGS

Figure 1:
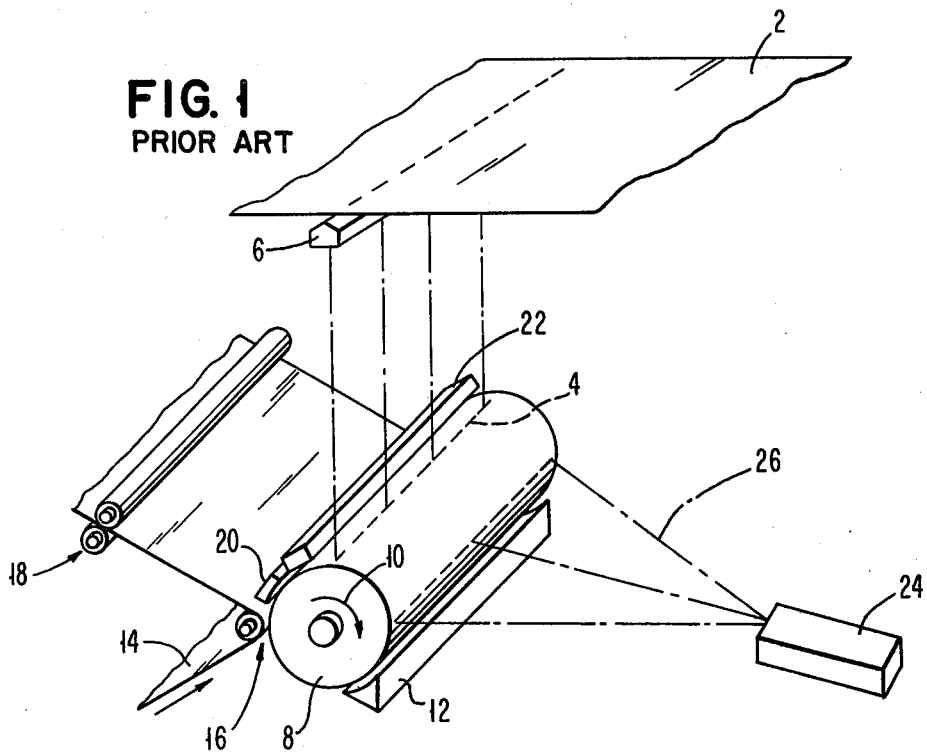
FIG. 1 is a simplified schematic representation of a present day electrophotographic printer/copier device.

In FIG. 1 there is shown a simplified schematic representation of an electrophotographic printer/copier. There is seen a document 2 from which an image is projected onto a photoconductor surface 4 via reflected light from a photo-optical system 6. Prior to projection of the image, surface 4 is charged by a corona cloud from a wire maintained at high voltage at charging station 22. The resulting image is in the form of a charge pattern on the photoconductor surface 4 which is contiguous with rotating drum 8. Drum 8 rotates in the direction of arrow 10. The charge pattern corresponding to the document image collects toner at toner station 12. The then toned image is transferred to the surface of a recording medium such as paper 14 at image transfer station 16 and is fused onto the paper 14 at rollers 18. After the section of drum 8 under consideration passes transfer station 16 it is cleaned by cleaner 20, after which the photoconductor surface 4 is recharged at charging station 22.

When the device is used in the printing mode the scanning laser 24 and its optical system is added. A scanned and modulated laser beam 26 is scanned on the photoconductor surface 4 adjacent to toner station 12 in order to discharge the photoconductor surface and thereby form a charged image thereon. As in the copier mode, the image is toned and transferred to a recording surface such as paper.

Figure 2:
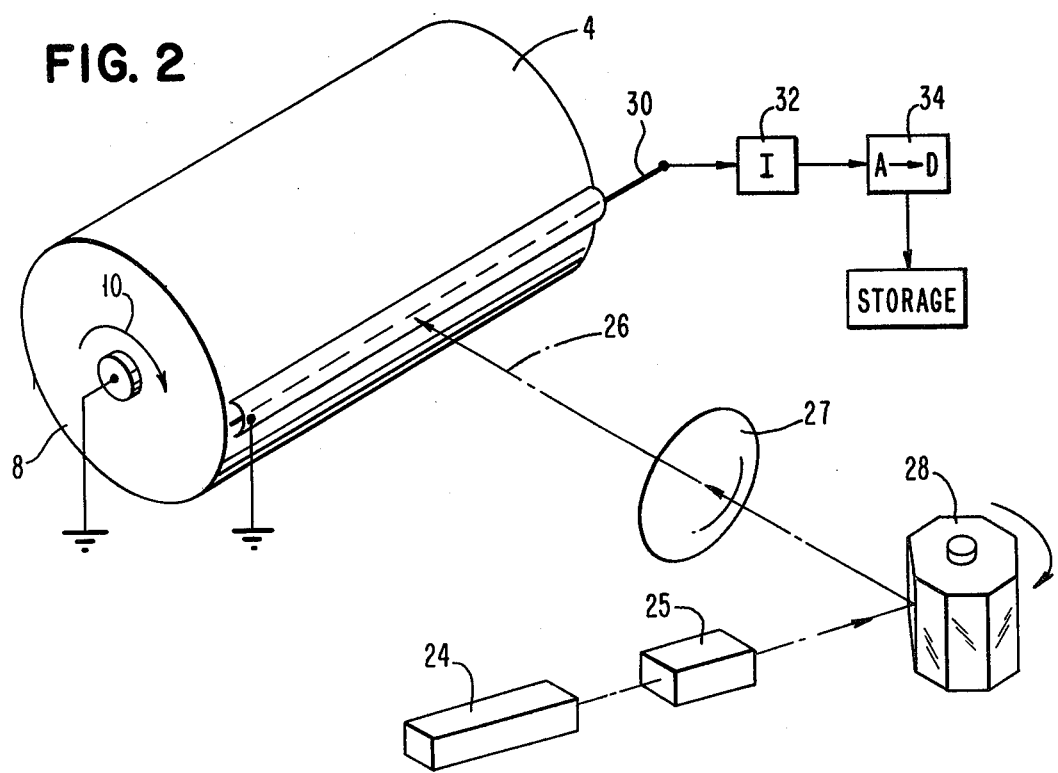
FIG. 2 is a schematic representation of a portion of a present day electrophotographic printer/copier device depicting the improvements of the present invention.

For the sake of simplicity in FIG. 2 there is shown only the drum 8 having photoconductor surface 4 thereon together with the additions of the present invention. In the present invention, an image is formed on the photoconductor 4 as indicated above. The image causes the formation of a charge pattern. As drum 8 is rotated in the direction of arrow 10 the image is scanned by laser beam 26. Laser beam 26 is generated from laser 24, is passed through modulator 25 and is scanned across drum 8 by rotating mirror segments 28 via lens 27. As laser beam 26 sweeps perpendicularly across the photoconductor surface 4, current is discharged from charged portions of the image where the original image was dark. The current discharged from the photoconductor 4 induces a current on a sense electrode 30, which is amplified. The amplified current is modified by the compensation circuit 32 then converted to a coded signal at codifier 34.

Figure 3:
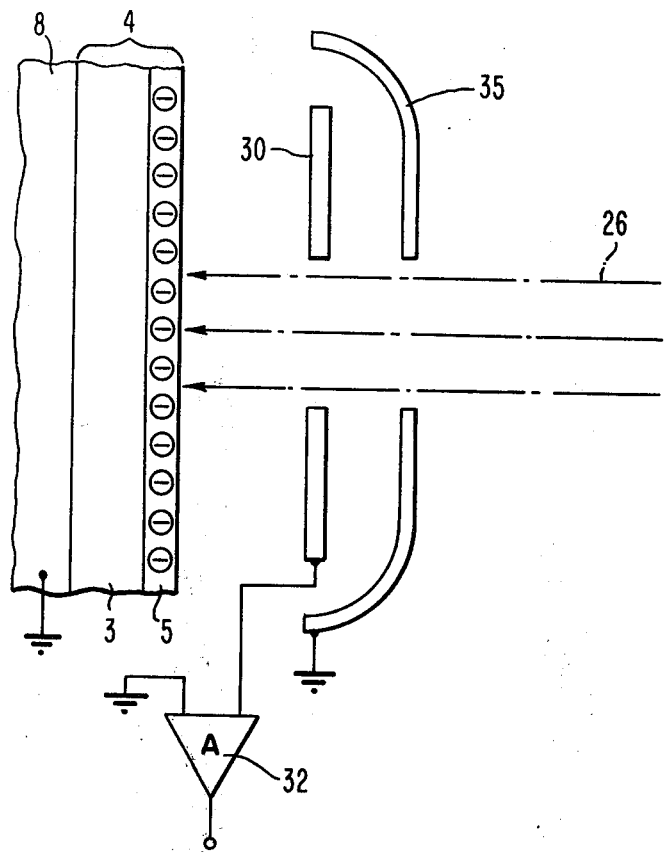
FIG. 3 is a cross sectional view of the sense electrode of the present invention including a drum having a photoconductor coating thereon.

FIG. 3 depicts the present invention in detail. There is shown sense electrode 30 together with compensation circuit 32. Adjacent to electrode 30 is shield 35 which is used to minimize noise that is present in the environment of the drum. A cross section of photoconductor 4 shows that the photoconductor 4 has both a transport layer 3 and a charge storage layer 5, as is common with photocopiers employing organic photoconductors.

In operation, the photoconductor surface 4 is charged at 22 by a corona wire maintained at a high voltage. The charged photoconductor 4 is exposed, as in a conventional photocopier (see FIG. 1), to light reflected from an image of the object to be copied. The result is a surface charge or potential image on the photoconductor 4 which corresponds to an image of the object. This surface charge is detected and stored electronically in the following manner. A laser beam 26 (6328Å, for example) is scanned across the surface of the photoconductor 4 as the photoconductor 4 is moved slowly in a direction perpendicular to the direction of scan. This laser scan system is represented schematically in FIG. 2. The small spot of laser light which is scanned impinging on the surface of the photoconductor causes the surface charge to be neutralized. As a result, the surface potential at the scanned spot changes from the initial charged value to about zero. The change in surface potential is detected by a detector or sense electrode 30 near the semiconductor surface along the path of the scanned light spot, and converted into a coded electronic signal suitable for facsimile transmission or for storage in a computer memory/storage.

Details of the charge detection are shown in FIG. 3, which displays schematically a cross-section of the photoconductor and the detection electrode. The peak of the current pulse produced by the discharge of one picture element of dimension $l^2$ is $i_p$, where $$i_p = \frac{Gl^2\epsilon_o}{d\tau} \Delta V_o,$$

and where
$\epsilon_o$ is the dielectric permittivity of free space
$\Delta V_o$ is the change in surface potential,
d is the photoconductor-electrode spacing,
G is a geometry factor, typically $0.1 < G < 10$
$\tau$ is the transit time of fast charge in the photoconductor.

For typical conditions the discharge of the fully charged, or unexposed, photoconductor will induce a charge i in the sense electrode $$i \approx \frac{(1)(10^{-4}M)^2(8.85 \times 10^{-12}Q/V - M)}{(10^{-3}M)(10^{-4}S)} (500V)$$

or $$i \approx 4.4 \times 10^{-7} A,$$

where the typical conditions are chosen to be the following,
G = 1
l = $10^{-4}$M
d = $10^{-3}$M
$\tau = 10^{-7}$S
$\Delta V = 500V$ The induced current is high enough to permit detection by a conventional low impedance video amplifier.

In practice the transit time may vary considerably from the $10^{-7}$ seconds chosen above as a typical value. The transit time $\tau$ for the rapid component of the discharge in typical photoconductive films lies in the range from $\tau = 2 \times 10^{-7}$ second to $2 \times 10^{-11}$ second.

This range of transit times is determined from relationship $$\tau \approx \frac{a^2}{\mu V},$$

where,
a is the thickness of the transport layer
$\mu$ is the carrier mobility
V is the initial surface voltage.
Typically, a = $10^{-5}$M, $\mu = 10^{-6}$ to $10^{-2}$M$^2$/V-sec., and V $\approx$ 500V, for the charge transport layers used in photocopying machines. At times long compared to the fast transit time, the current is dominated by the slow component which is due to the trapping and re-release of charge.

Noise in the image detection system can be classified into a few dominant categories: microphonic noise due to vibration of the electrode ribbon, noise in the laser light source, and leakage electromagnetic interference (EMI) from the corona wire used in the photocopier. The microphonic noise can be minimized by standard vibration damping techniques. EMI noise, particularly that generated by the corona wire, can be minimized by shielding the detector electrode 30 with shield 35 and input circuitry. Laser noise depends upon the type and age of the laser and its power supply.

Figure 4:
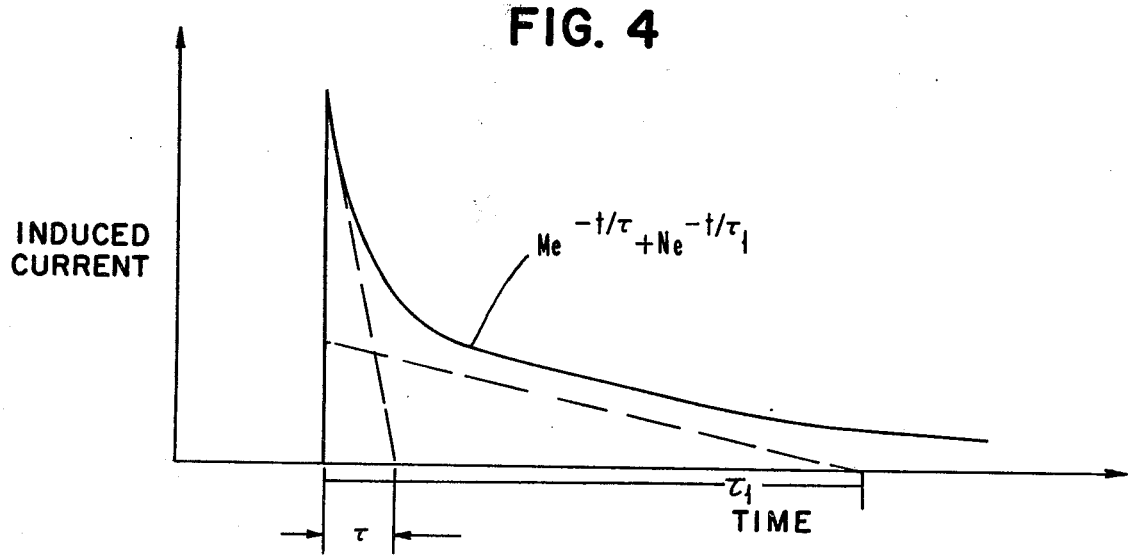
FIG. 4 is a waveform depicting the general characteristics of the current induced in the sense electrode when a beam of light is scanned across a charged area of a photoconductor.

A difficulty with the laser discharge method of detection arises because of the complex time response of the photoconductor. The instantaneous excitation of charge results in an induced current which extends over a finite period of time. The two components of the time response, fast and slow, are determined by the transit time and the trap hopping time, respectively, for charge carriers in the charge transport layer 3. The induced current produced by scanning the laser across a negligibly small spot of charge is represented in FIG. 4. Each spot of charge which is discharged by the scanned laser induces a similar component of current, all of which add up to the total measured current.

The induced current in the ideal case represented by $V_1$, in FIG. 4, rises rapidly to a maximum value and then decays exponentically with the fast time constant $\tau$, which is due to the finite transit time of the charge carriers. A large background current due to the straggling of charge carriers decays more slowly, with a time constant $\tau_1$. Generally, the transit time $\tau_1$ is comparable to the time required to scan one picture element, while the time $\tau$, is much longer. The effect of the finite decay times $\tau$ and $\tau_1$ is to blur the images detected by this technique. A technique for improving the detected image by removing the blurring of the image involves the use of an electronic de-convolution circuit. One example of such a circuit is shown in FIG. 5.

Figure 5:
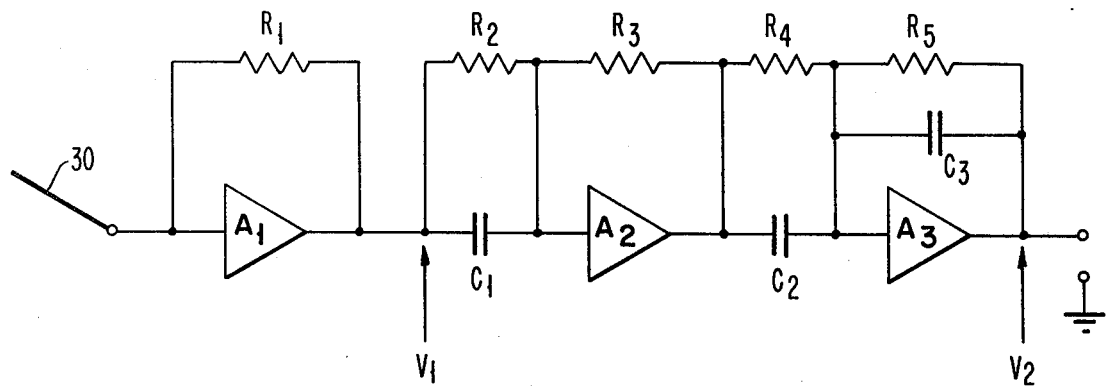
FIG. 5 shows a circuit schematic for the deconvolution of a signal produced from the sense electrode of the present invention.
Figure 6A:
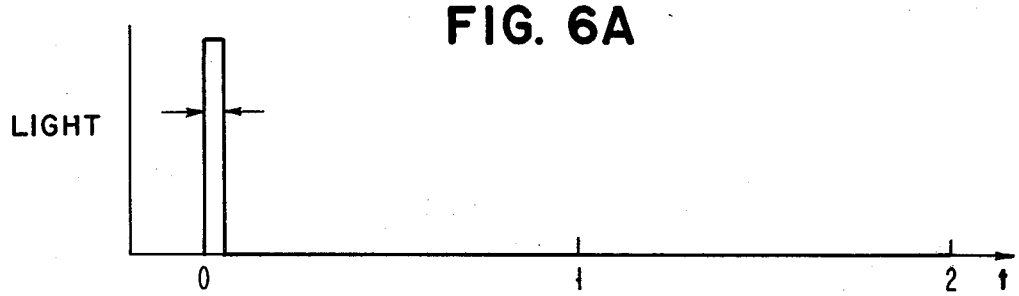
FIGS. 6a–6c represents stages of the signal formation, detection and deconvolution from the circuit of FIG. 7.
Figure 6B:
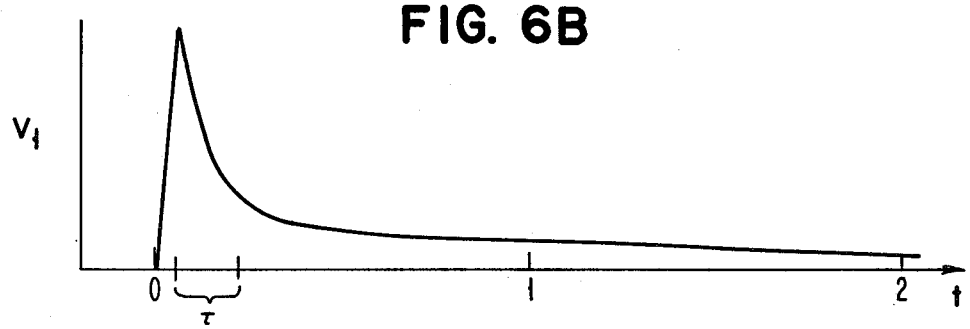

The operation of the deconvolution circuit in FIG. 5 is outlined by the sequence of signals shown in FIG. 6. Here, a pulse of light is applied to a charged area of the photoconductor, as is represented in FIG. 6A. The discharge of the photoconductor surface induces a current in the sense electrode 30, which is detected as a voltage $V_1$. The voltage $V_1$, which decays with both a fast component $\tau$ and a slow component $\tau_1$, is equal to the induced current multiplied by $R_1$. The amplifiers $A_1$, $A_2$ and $A_3$ are high gain, wide band operational amplifiers. The voltage $V_1$ is typically $$V_1 = Me^{-t/\tau} + Ne^{-t/\tau_1},$$

where M and N are characteristic of the photoconductor. The output voltage $V_2$ from the compensation circuit is $$V_2 = \frac{R_3 C_1 C_2}{C_3} \frac{(S + \frac{1}{R_4 C_2})(S + \frac{1}{R_2 C_1})}{(S + \frac{1}{R_5 C_3})} V_1$$

where the notation is in the Laplace transform notation. The combination of resistors and capacitors is adjusted so that, $R_2 C_1 = \tau$,
$R_4 C_2 = \tau_1$,
and $$R_5 C_3 = \frac{(M+N)\tau\tau_1}{M\tau_1 + N\tau}.$$

Figure 6C:
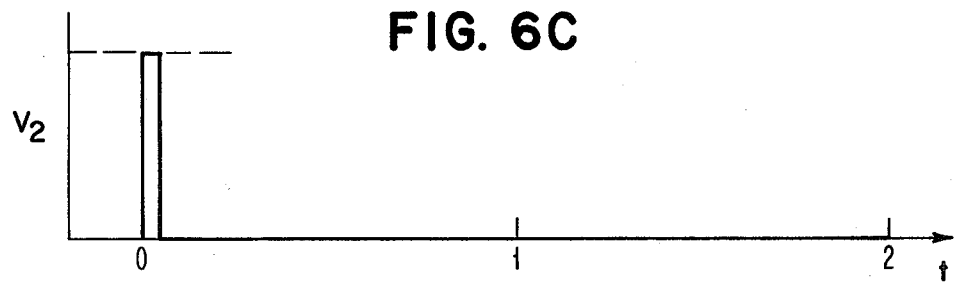

The resistors may all be chosen to be a common value such as $10 K\Omega$ so that the capacitors $C_1$, $C_2$, and $C_3$ are determined from the equations supra. For such values of components, the output of the compensation circuit is $V_2$, which shows no effect of the blurring due to the finite decay times $\tau$ and $\tau_1$, as is illustrated in FIG. 6C.

Figure 7:
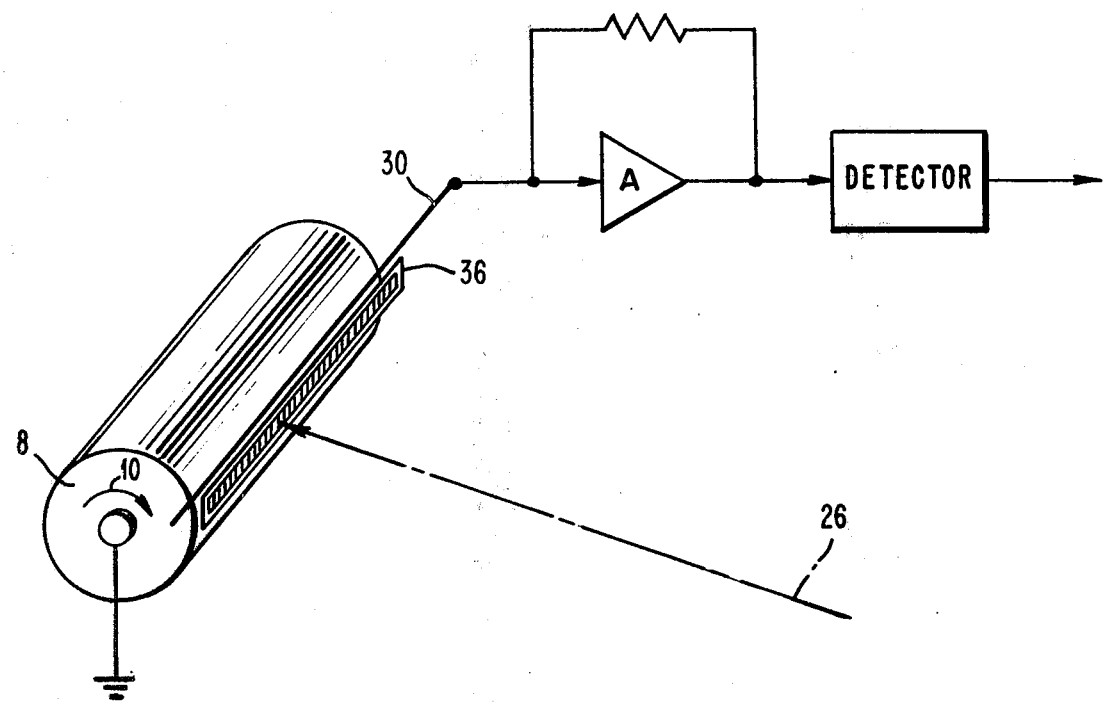
FIG. 7 is a representation of an alternate method of using a segmented screen in conjunction with the sense electrode along with the circuit schematic for compensation of photoconductor time response.

An alternate scheme for eliminating the effect of the finite response time of the photoconductor is outlined in FIG. 7. Here, the scanned laser light beam 26 is chopped at a fixed frequency, and the resulting current measured on the sense electrode 30 is amplified and filtered to detect signals at the chopping frequency. The output of the detector does not exhibit the blurring of the detected image which is normally caused by the finite response time of the photoconductor. In this scheme, it is important that the chopping frequency is higher than the highest frequency in the detected signal. One scheme for accomplishing the chopping of the scanned laser light involves passing the scanning laser beam through a slotted aperture 36 which is in proximity to the sense electrode structure, as is illustrated in FIG. 7.

What is claimed is:

1. An improved printer/copier device including an optical system for projecting an image onto a charged photoconductor surface, means for toning said image, means for transferring said image onto a recording medium, laser beam scanning means for printing information onto said photoconductor surface; the improvement being that said laser beam scanning means also having the capability of point by point discharging the image on said photoconductor surface and a single sensing electrode to detect changes in charge on said photoconductor surface when said surface is being scanned by said laser beam and means for correcting time decay in a waveform provided by said detected change in charge.

2. An improved printer/copier device according to claim 1 wherein there is included means for converting said changes in charge into a coded signal capable of being transmitted and stored in a computer.

3. An improved printer/copier device according to claim 2 wherein said means for converting said changes in charge into a coded signal includes deconvolving and compensating circuitry.

4. An improved printer/copier device according to claim 3 wherein there is included a shield member for shielding said sensing electrode to thereby minimize environmental noise.

5. An improved printer/copier device according to claim 4 wherein said shield is slotted, to periodically interrupt said laser beam as it scans across said photoconductor surface.

6. An improved scanning device for scanning information from photocopying media and communicating the same including:
a laser for scanning and for point by point discharging of an image on a charged photoconductor surface, a single sensing electrode for detecting a change in charge on said photoconductor surface produced when said surface is being scanned by said laser, means for converting said change in charge into a coded signal capable of being communicated, and means for shielding said single sensing electrode.

7. An improved scanning device according to claim 6 wherein said means for shielding said single sensing electrode is slotted to interrupt a laser beam as it scans said photoconductor surface.

* * * * *